United States Patent
Wyatt et al.

(10) Patent No.: US 9,877,162 B2
(45) Date of Patent: *Jan. 23, 2018

(54) SYSTEMS AND METHODS FOR GENERATING A USER LOCATION HISTORY

(71) Applicant: Google Inc., Mountain View, CA (US)

(72) Inventors: Daniel Mark Wyatt, San Francisco, CA (US); Renaud Bourassa-Denis, New York, NY (US); Alexander Fabrikant, Menlo Park, CA (US); Tanmay Sanjay Khirwadkar, Sunnyvale, CA (US); Prathab Murugesan, Sunnyvale, CA (US); Galen Pickard, Palo Alto, CA (US); Jesse Rosenstock, Mountain View, CA (US); Rob Schonberger, Mountain View, CA (US); Anna Teytelman, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/290,916

(22) Filed: Oct. 11, 2016

(65) Prior Publication Data

US 2017/0034665 A1 Feb. 2, 2017

Related U.S. Application Data

(63) Continuation of application No. 14/663,494, filed on Mar. 20, 2015, now Pat. No. 9,467,815.

(Continued)

(51) Int. Cl.
*H04W 24/00* (2009.01)
*H04W 4/02* (2009.01)

(52) U.S. Cl.
CPC .................. *H04W 4/028* (2013.01)

(58) Field of Classification Search
CPC ..................................... H04W 4/028

(Continued)

(56) References Cited

U.S. PATENT DOCUMENTS

| 8,275,649 B2* | 9/2012 | Zheng | G06Q 30/02 705/7.29 |
| 8,521,571 B1* | 8/2013 | Fischer | G06Q 10/06 705/7.11 |

(Continued)

FOREIGN PATENT DOCUMENTS

| WO | WO 2013/192583 | 12/2013 |
| WO | WO 2014/004532 | 1/2014 |

OTHER PUBLICATIONS

Adomavicius et al., Incorporating Contextual Information in Recommender Systems Using a Multidimensional Approach, ACM Transactions on Information Systems, vol. 23, No. 1, Jan. 2005, pp. 103-145.

(Continued)

*Primary Examiner* — Santiago Garcia
(74) *Attorney, Agent, or Firm* — Dority & Manning, P.A.

(57) ABSTRACT

Systems and methods for generating a user location history are provided. One example method includes obtaining a plurality of location reports from one or more devices associated with the user. The method includes clustering the plurality of location reports to form a plurality of segments. The method includes identifying a plurality of location entities for each of the plurality of segments. The method includes determining, for each of the plurality of segments, one or more feature values associated with each of the location entities identified for such segment. The method includes determining, for each of the plurality of segments, a score for each of the plurality of location entities based at least in part on a scoring formula. The method includes (Continued)

selecting one of plurality of locations entities for each of the plurality of segments.

20 Claims, 9 Drawing Sheets

Related U.S. Application Data

(60) Provisional application No. 61/955,891, filed on Mar. 20, 2014.

(58) Field of Classification Search
USPC .................................................. 455/456.1
See application file for complete search history.

(56) References Cited

U.S. PATENT DOCUMENTS

| | | | |
|---|---|---|---|
| 2006/0069702 A1* | 3/2006 | Moeller ................. | G06F 9/542 |
| 2006/0101377 A1 | 5/2006 | Toyama et al. | |
| 2006/0178932 A1* | 8/2006 | Lang ...................... | G06Q 30/02 705/14.73 |
| 2006/0262352 A1* | 11/2006 | Hull .................. | G06F 17/30247 358/1.18 |
| 2006/0266830 A1 | 11/2006 | Horozov et al. | |
| 2006/0285772 A1* | 12/2006 | Hull .................. | G06F 17/30247 382/305 |
| 2007/0218900 A1 | 9/2007 | Abhyanker | |
| 2008/0004036 A1* | 1/2008 | Bhuta .................. | G01S 5/0252 455/456.1 |
| 2008/0015928 A1 | 1/2008 | Chandra | |
| 2008/0172173 A1* | 7/2008 | Chang .................... | G01C 21/30 701/408 |
| 2008/0194271 A1* | 8/2008 | Bedekar ............... | H04W 68/00 455/456.2 |
| 2008/0243821 A1 | 10/2008 | Delli Santi et al. | |
| 2008/0268866 A1* | 10/2008 | Sukkarie ............... | G07C 5/008 455/456.1 |
| 2009/0201149 A1* | 8/2009 | Kaji ....................... | G01C 21/20 340/539.13 |
| 2010/0153292 A1 | 6/2010 | Zheng et al. | |
| 2011/0276565 A1 | 11/2011 | Zheng et al. | |
| 2011/0314502 A1* | 12/2011 | Levy ..................... | H04N 7/106 725/46 |
| 2012/0289147 A1* | 11/2012 | Raleigh ............... | H04L 67/2847 455/3.06 |
| 2013/0086072 A1 | 4/2013 | Peng et al. | |
| 2013/0167196 A1* | 6/2013 | Spencer ................. | H04W 8/22 726/3 |
| 2013/0225201 A1* | 8/2013 | Chen ........................ | G01S 5/02 455/456.2 |
| 2014/0310268 A1* | 10/2014 | Rosenstock ....... | G06F 17/30241 707/724 |
| 2015/0079932 A1* | 3/2015 | Zelinka ................. | H04W 12/02 455/411 |
| 2015/0163206 A1* | 6/2015 | McCarthy ........... | G06F 21/6227 713/171 |
| 2015/0206186 A1* | 7/2015 | Pitchaikani ............. | H04L 67/20 705/14.58 |
| 2015/0241229 A1* | 8/2015 | Moeglein .............. | G01S 5/0236 455/456.2 |

OTHER PUBLICATIONS

Adomavicius et al., "Toward the Next Generation of Recommender Systems: A Survey of the State-of-the-Art and Possible Extensions", IEEE Transactions on Knowledge and Data Engineering, vol. 17, No. 6, Jun. 2005, pp. 734-749.
Angie's List, Wikipedia, http://en.wikipedia.org/wiki/Angie%27s_List, retrieved on Aug. 10, 2011, 4 pages.
Caron et al., "Groupanizer: a Method to Correlate Multi-Users Position with Daily Moments", Proceedings of the Fourth Annual IEEE International Conference on Pervasive Computing and Communications Workshops, Pisa, Italy, Mar. 13-17, 2006, 6 pages.
Citysearch, http://www.citysearch.com, retrieved on Aug. 10, 2011, 1 page.
Citysearch, Wikipedia, http://www.en.wikipedia.org/wiki/Citysearch, retrieved on Aug. 10, 2011, 3 pages.
Foursquare, https://foursquare.com/, retrieved on Aug. 11, 2011, 1 page.
Four Square (Disambiguation), Wikipedia, http://en.wikipedia.org/wiki/Four_square_ (disambiguation), retrieved on Aug. 11, 2011, 1 page.
Google Answers: View Questions in Computers, http://answers.google.com/answers/browse/1200.html, retrieved on Aug. 10, 2011, 3 pages.
Google Maps, http://maps.google.com, retrieved on Aug. 10, 2011, 1 page.
Herring et al., "Determining Geo-Locations of Users from User Activities", U.S. Appl. No. 13/458,895, filed Apr. 27, 2012.
Liao et al., "Building Personal Maps from GPS Data", Annals of the New York Academy of Sciences, vol. 1093, Dec. 2006, pp. 249-265.
Maennel, "Determining Geo-Locations of Users from User Activities", U.S. Appl. No. 13/830,182, filed Mar. 14, 2013.
Maennel, "Location Direction from Queries Using Evidence for Location Alternatives", U.S. Appl. No. 13/831,549, filed Mar. 14, 2013.
Mountain View Restaurants, Dentists, Bars, Beauty Salons, Doctors, http://www.yelp.com/mountain-view-ca, retrieved on Aug. 10, 2011, 2 pages.
Schafer et al., "Collaborative Filtering Recommender Systems", Lecture Notes in Computer Science, vol. 4321, 2007 pp. 291-324.
Takeuchi et al., "CityVoyager: An Outdoor Recommendation System Based on User Location History", Lecture Notes in Computer Science, vol. 4159, 2006, pp. 625-636.
Wang et al., "A User-Centric Approach for Social Data Integration and Recommendation", Third International Conference on Human-Centric Computing, Cebu, Philippines, Aug. 11-13, 2010, 8 pages.
Yahoo! Answers, http://answers.yahoo.com/, retrieved on Aug. 10, 2011, 5 pages.
Ye et al., "Mining Individual Life Pattern Based on Location History", Tenth International Conference on Mobile Data Management: Systems, Services and Middleware, Taipei, Taiwan, May 18-20, 2009, 10 pages.
Yelp, Inc., Wikipedia, http://en.wikipedia.org/wiki/Yelk,_Inc, retrieved on Aug. 10, 2011, 1 page.
Yingchen et al., "An Ontology-Based Approach for Mobile Personalized Recommendation", 2009 IITA International Conference on Services Science, Management and Engineering, Zhangjiajie, China, Jul. 11-12, 2009, pp. 336-339.
Zheng et al., "Collaborative Location and Activity Recommendations with GPS History Data", World Wide Web 2010 , Raleigh, North Carolina, Apr. 26-30, 2010, pp. 1029-1038.
Zheng et al., "GeoLife: A Collaborative Social Networking Service Among User, Location and Trajectory", Bulletin of the IEEE Computer Society Technical Committee on Data Engineering, Jun. 2010, 8 pages.

* cited by examiner

SYSTEMS AND METHODS FOR GENERATING A USER LOCATION HISTORY

PRIORITY CLAIM

This application is a continuation of U.S. application Ser. No. 14/663,494 having a filing date of Mar. 20, 2015, which claims priority to U.S. Provisional Patent Application Ser. No. 61/955,891 entitled "Systems and Methods for Generating a User Location History," filed on Mar. 20, 2014. Applicant claims priority to benefit of all such applications and incorporate all such applications herein by reference.

FIELD

The present disclosure relates generally to systems and methods for generating a user location history. In particular, the present disclosure is directed to systems and methods for analyzing raw location reports received from one or more devices associated with a user to identify one or more real world location entities visited by the user.

BACKGROUND

Many different techniques exist for attempting to determine a location associated with a device. For example, location based on GPS, IP address, cell triangulation, proximity to WiFi access points, or other techniques can be used to identify a device's current location. Furthermore, many commonly used computing devices (e.g. a smartphone or tablet) contain the necessary components for periodically performing the above noted techniques to determine their respective locations.

Thus, one or more devices associated with a user can periodically determine their location and report this information to a central computing system (e.g. one or more servers) to provide a log of their location over time. Aggregating this information can result in a history of the user's location over a period of time.

However, the locations reported by the one or more devices can be raw location data. For example, the reported location can be a geocode that identifies a latitude and longitude. Therefore, such raw location data can fail to identify a particular entity (e.g. restaurant, park, or other point of interest) that the user was visiting at the time.

As such, use of the raw data in furtherance of location-enhanced services can fail to provide any contextual information that would more appropriately personalize the location-enhanced services.

In particular, when a person reflects upon the locations she visited over a day or other significant time period, she may tend to conceptualize the time into segments spent at various particular locations. For example, a typical day may include morning activities at home, a breakfast at a coffee shop, time spent at work, and then an afternoon happy hour with friends at a restaurant prior to returning home.

Thus, human perceptions of location history are generally based on time spent at particular locations associated with human experiences and a sense of place, rather than a stream of latitudes and longitudes collected periodically. Therefore, one challenge in creating and maintaining a user location history that is accessible for enhancing one or more services (e.g. search, social, or an API) is to correctly identify particular location entities visited by a user based on raw location reports.

SUMMARY

Aspects and advantages of the present disclosure will be set forth in part in the following description, or may be obvious from the description, or may be learned through practice of embodiments of the present disclosure.

One example aspect of the present disclosure is directed to a method for generating a location history for a user. The method includes obtaining, by one or more computing devices, a plurality of location reports from one or more devices associated with the user. Each of the plurality of location reports indicates an associated location and time. The method includes clustering, by the one or more computing devices, the plurality of location reports to form a plurality of segments. Each of the plurality of segments includes one or more of the plurality of location reports. The method includes identifying, by the one or more computing devices, a plurality of location entities for each of the plurality of segments. The plurality of location entities for each of the plurality of segments comprise location entities that are located approximate to one or more of the locations associated with one or more of the location reports included in such segment. The method includes determining, by the one or more computing devices for each of the plurality of segments, one or more feature values associated with each of the location entities identified for such segment. The one or more feature values are respectively determined for one or more features describing information about the location entity being valued. The method includes determining, by the one or more computing devices for each of the plurality of segments, a score for each of the plurality of location entities based at least in part on a scoring formula. The scoring formula provides the score for each location entity based at least in part on a comparison of the one or more feature values associated with the location entity being scored versus the feature values associated with all other location entities identified for the segment of the location entity being scored. The method includes selecting, by the one or more computing devices, one of plurality of locations entities for each of the plurality of segments for inclusion in the location history based at least in part of the scores associated with the plurality of location entities.

These and other features, aspects and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling description of the present disclosure, directed to one of ordinary skill in the art, is set forth in the specification, which makes reference to the appended figures, in which.

DETAILED DESCRIPTION

Figure 1:
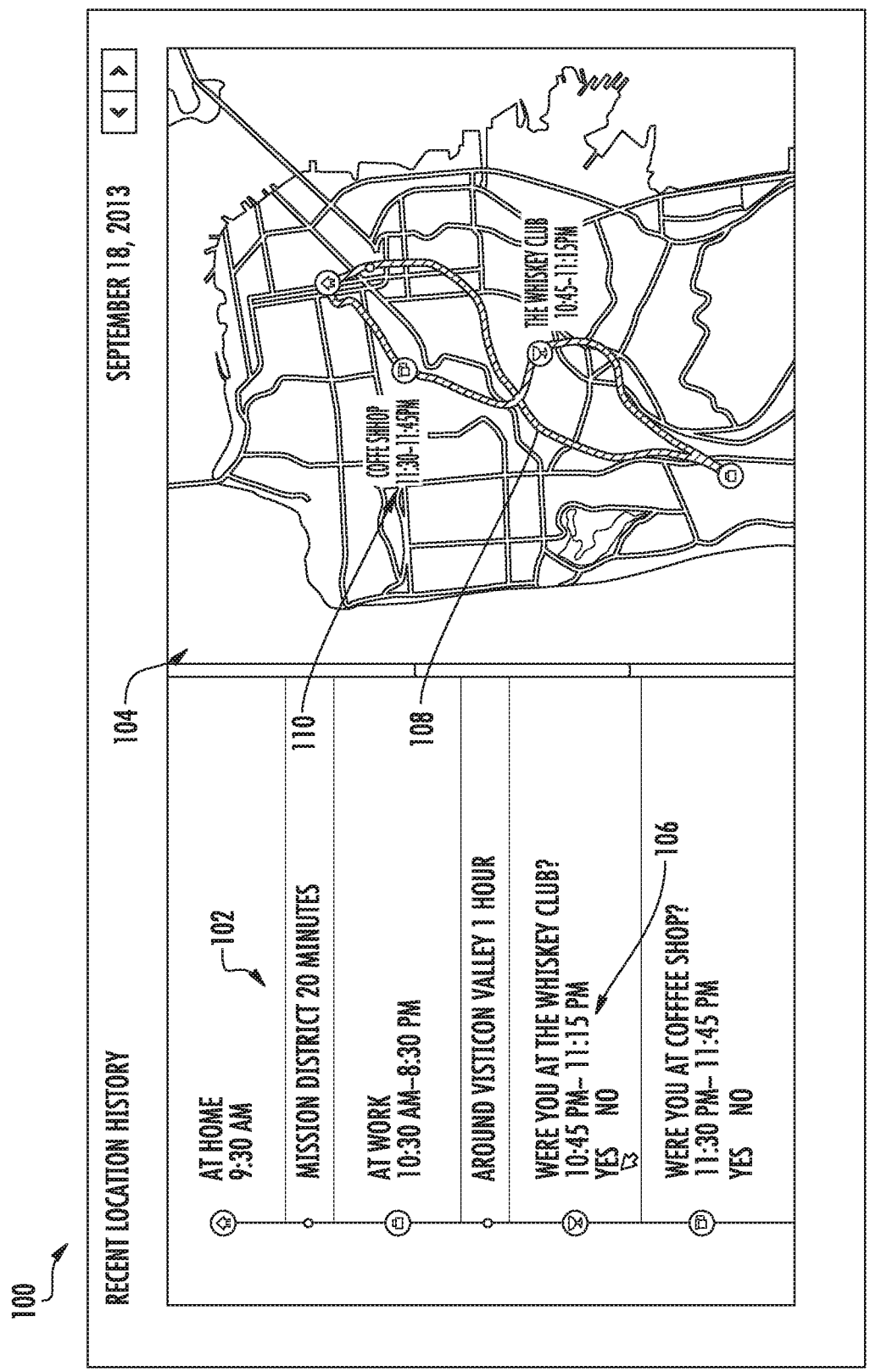
FIG. 1 depicts an example user interface providing an example graphical representation of a user location history according to an example embodiment of the present disclosure.

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made to the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

Generally, the present disclosure is directed to systems and methods for generating a location history for a user based on raw location reports received from one or more devices associated with the user. In particular, the systems and methods of the present disclosure can analyze the raw location reports to identify one or more real world location entities (e.g. restaurants, parks, or other points of interest) that the user has likely visited. Thus, the present disclosure can be used to "snap" raw location reports identifying only a geographic location to a sequence of particular location entities, thereby generating a location history for the user. The generated user location history can be stored and then later accessed to provide personalized location-influenced search results. As another example, a system implementing the present disclosure can provide the location history to the user via an interactive user interface that allows the user to view, edit, and otherwise interact with a graphical representation of her location history.

More particularly, one or more devices associated with a user can periodically provide a raw location report to one or more servers implementing the present disclosure. In particular, each location report can provide a time and a location. For example, the location included in each location report can be a geocode (e.g. latitude and longitude), IP address information, WiFi location information, or other information identifying or associated with a particular location.

Thus, in some embodiments, in order to obtain the benefits of the techniques described herein, the user may be required to allow the collection and analysis of location information associated with the user or her device. For example, in some embodiments, users may be provided with an opportunity to control whether programs or features collect such information. If the user does not allow collection and use of such signals, then the user may not receive the benefits of the techniques described herein. The user can also be provided with tools to revoke or modify consent. In addition, certain information or data can be treated in one or more ways before it is stored or used, so that personally identifiable information is removed.

According to an aspect of the present disclosure, the plurality of location reports can be clustered into a plurality of segments. As an example, the plurality of location reports can be clustered based on location or time. Thus, for example, if a number of location reports are received that provide the same general location over a significant period of time, then such reports can be clustered together to form a segment and the segment can be further analyzed to identify an associated location entity.

As another example, in some embodiments, a score can be determined for each of a plurality of candidate segments. For example, the score for each candidate segment can be based on a distance from each location report included in such candidate segment to a mean location associated with the candidate segment. The candidate segments receiving the highest scores can be selected for use by a system implementing the present disclosure.

Further, a starting time and ending time can be associated with each segment. For example, the starting time for each segment can be the earliest time associated with any location report included in such segment. Likewise, the ending time for each segment can be the latest time associated with any location report included in such segment. In some implementations, if the ending time of a segment minus the starting time of the segment is not greater than a threshold value (e.g. ten minutes), then such segment can be discarded or otherwise ignored.

According to another aspect of the present disclosure, a plurality of location entities can be identified for each of the plurality of segments. As an example, map data can be analyzed to identify all location entities that are within a threshold distance from a segment location associated with the segment. Thus, for example, all businesses or other points of interest within 1000 feet of the mean location of all location reports included in a segment can be identified.

According to yet another aspect of the present disclosure, one or more feature values can be determined for each of the identified location entities. More particularly, the one or more feature values determined for each location entity can respectively correspond to one or more features describing information about the location entity being valued.

As an example, the one or more features can be one or more distance features that describe a distance between the location entity being valued and a segment location associated with the segment for which the location entity was identified. For example, the distance feature can be the distance between the location entity being valued and the segment location divided by the max distance associated with any location entity identified for such segment.

As another example, the one or more features can be one or more popularity features describing a popularity of the location entity being valued. For example, the popularity features can include a number of social media mentions associated with the location entity being valued; a number of check-ins associated with the location entity being valued; a number of requests for directions to the location entity being valued; and/or and a global popularity rank associated with the location entity being valued.

As yet another example, the one or more features can include a business hour overlap feature. In particular, the business hour overlap feature can describe whether a set of business hours associated with the location entity being valued overlap with a segment time associated with the segment with respect to which the location entity being valued was identified.

As another example, the one or more features can include one or more personalization features describing previous interaction between the user and the location entity being valued. For example, the personalization features can measure a number of instances in which the user performed a map click with respect to the location entity being valued; a number of instances in which the user requested directions to the location entity being valued; a number of instances in which the user has checked-in to the location entity being valued; a number of instances in which the user has transacted with the location entity as evidenced by data obtained from a mobile payment system or virtual wallet; and/or a number of instances in which the user has performed a web search query with respect to the location entity being valued.

Thus, for example, a location entity with which the user has frequently interacted with in the past can receive larger personalization feature values. Furthermore, in some implementations, the personalization features can further describe or otherwise take into account a temporal correlation between the previous interactions between the user and the location being valued and a segment time associated with the segment for which the location entity being valued was identified. For example, more recent interactions can more positively influence feature values than less recent interactions.

According to another aspect of the present disclosure, each location entity identified for each segment can be scored according to a scoring formula. In particular, the scoring formula can provide a score for each location entity based at least in part on a comparison of the one or more feature values associated with the location entity being scored versus the feature values associated with all other location entities identified for the segment of the location entity being scored.

As an example, in some implementations, a scoring formula numerator can equal the exponential function evaluated at a total feature value associated with the location entity being scored. In particular, the total feature value can equal the sum of each feature value associated with the location entity being scored multiplied by one of a plurality of weighting values respectively associated with the features. Likewise, the scoring formula denominator can equal a summation, for all other location entities identified for the segment, of the exponential function respectively evaluated at the total feature value for each of such location entities.

Once a score has been computed for each location entity identified for a segment, one or more of the location entities can be selected for inclusion in the user location history based on the scores. As an example, if the score of the highest-scoring location entity is greater than a threshold value, then the highest-scoring location entity can be selected for the segment and can be included in the user location history.

Thus, the user location history can reflect that the user visited the selected location entity from about the starting time of the segment to the ending time of the segment. Performing the above discussed methods for each of a plurality of segments can result in a robust user location history that includes real world location entities visited by the user.

According to another aspect of the present disclosure, the user location history can be accessed to provide various location-enhanced services to the user. As an example, the user location history can be analyzed to provide location-enhanced search results to a user based on the actual historical locations of the user.

For example, a user may enter a search query that references the user's historical location (e.g. "Thai restaurant I ate at last Thursday"). When it is recognized that the search query references the user's location history, then the user's location history can be analyzed in light of the search query. Thus, for example, the user location history can be analyzed to identify any Thai restaurants visited on a certain date and then provide such restaurants as results in response to the search query.

As another example, a system implementing the present disclosure can provide the location history to the user via an interactive user interface that allows the user to view, edit, and otherwise interact with a graphical representation of her location history.

As an example, in some implementations, a user reviewing a graphical representation of her location history can indicate that one of the location entities included in her location history is erroneous (e.g. that she did not visit such location). In response, the user can be presented with one or more of the location entities that were identified for the segment for which the incorrect location entity was selected and can be given an opportunity to select a replacement location.

In other implementations, opportunities to perform other edits, such as deleting, annotating, uploading photographs, providing reviews, etc., can be provided in the interactive user interface. In such fashion, the user can be provided with an interactive tool to explore, control, share, and contribute to her location history.

In further embodiments of the present disclosure, a location entity can be associated with a user action within the context of a location history. For example, the user action can be making a purchase (e.g. with a digital wallet) or taking a photograph. In particular, in some embodiments, the user action or an item of content generated by the user action (e.g. the photograph or receipt) can be analyzed to assist in identifying the location entity associated with such user action. For example, the analysis of the user action or item of content can contribute to the score determined for each location entity identified for a segment.

Thus, the systems and methods of the present disclosure can be implemented to generate a location history for a user based on raw location reports received from one or more devices associated with the user. In addition, the resulting user location history can be used to provide various location-enhanced services.

With reference now to the FIGS., example embodiments of the present disclosure will be discussed in further detail.

FIG. 1 depicts an example user interface 100 displaying an example graphical representation of a user location history according to an example embodiment of the present disclosure. The graphical representation of the user location history can include a timeline 102 and a map 104.

As an example, a user can log-in or provide identifying information to access user interface 100. In particular, after providing identifying information, a client device can request and receive the user location history from a server and then display the user location history within user interface 100, as shown in FIG. 1.

Timeline 102 can provide a chronological listing of location entities visited by the user. For example, timeline 102 indicates that, according to the user's location history, on Sep. 18, 2013 the user was at the user's home at about 9:30 AM; spent about 20 minutes in the Mission District area;

was at the user's workplace from about 10:30 AM to 8:30 PM; spent about 1 hour in the Visticon Valley area; was at The Whiskey Club bar from about 10:45 PM to 11:15 PM; was at Coffee Shop from about 11:30 PM to 11:45 PM; and then returned home at midnight.

User interface 100 can provide one or more opportunities for the user to verify or validate location information. For example, portion 106 of timeline 102 offers an opportunity for the user to confirm that she did in fact visit The Whiskey Club. Furthermore, portion 106 can also provide an opportunity for the user to confirm that she visited The Whiskey Club from 10:45 PM to 11:15 PM. In further embodiments, opportunities can be provided for the user to confirm the presence of one or more additional users that visited the location entity with the user.

As will be discussed further below, the user interface 100 can provide various opportunities for the user to edit, control, share, personalize, or otherwise modify, explore, or interact with her location history. In particular, the user can interact with her location history based on semantic entries of location entities (e.g. the "name" of a location entity) as opposed to the location entities' locations or coordinates.

Map 104 can provide a graphical depiction of the user's location as it changed over the course of the selected time period. For example, one or more routes (e.g. route 108) taken by the user can be overlaid upon a map showing the corresponding geographical area traversed by the user. In addition, one or more icons (e.g. icon 110) indicating particular location entities visited by the user can be overlaid upon the map. Similar to timeline 102, in some implementations, map 104 can be interactive and editable. Furthermore, in some embodiments, route 108 can be an approximated route between location entities identified as having been visited by the user.

Figure 2:
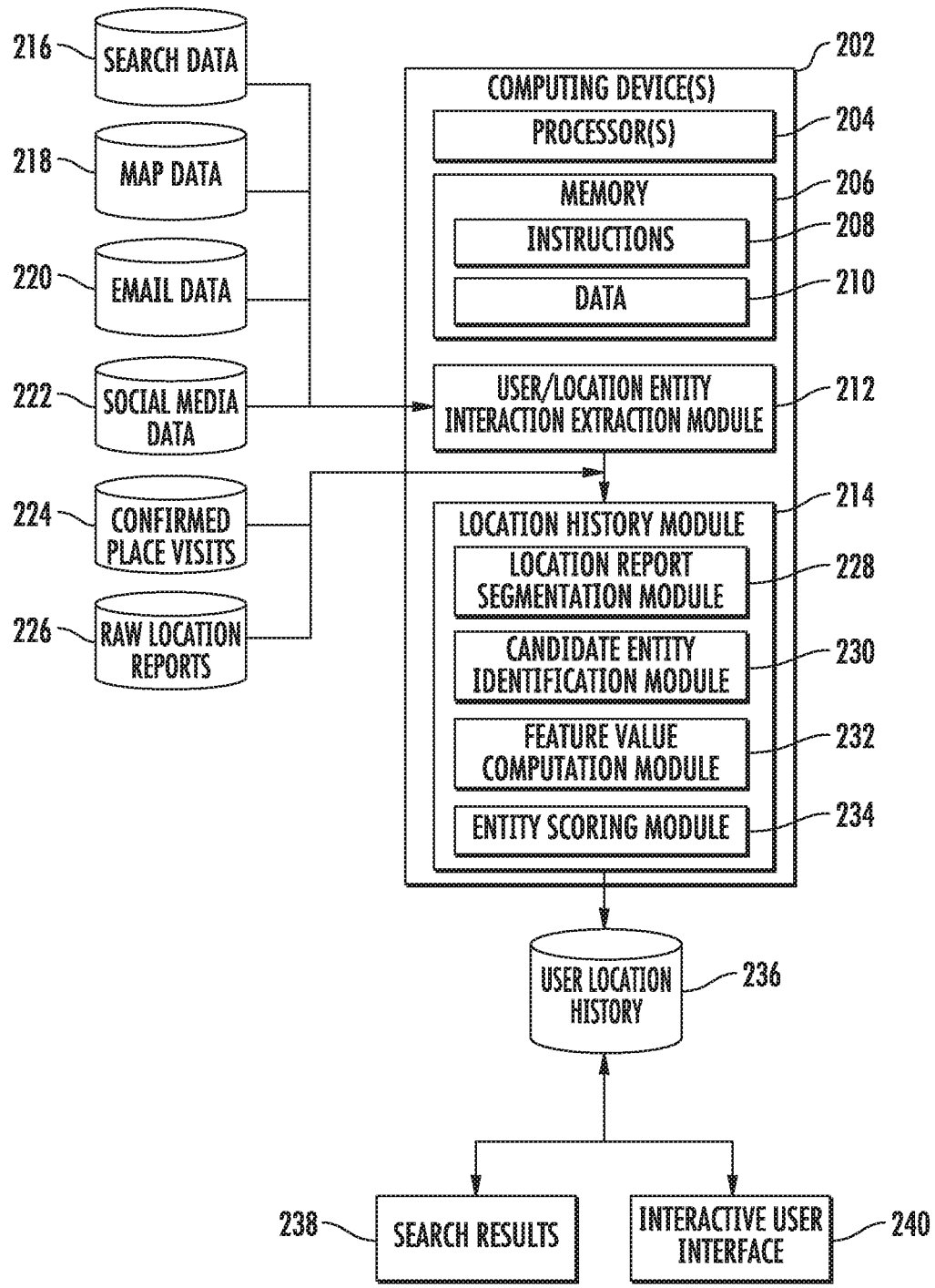
FIG. 2 depicts an example system for generating a user location history according to an example embodiment of the present disclosure.

FIG. 2 depicts an example system 200 for generating a user location history according to an example embodiment of the present disclosure. System 200 can include one or more computing devices 202. Computing device(s) 202 can be any form of computing device, including, for example, server computing devices or other devices. Computing device(s) 202 can operate in any form of a distributed or parallel computing architecture.

Computing device(s) 202 can include one or more processors 204 and a memory 206. Processors 204 can be any suitable processing device and can be one processor or a plurality of processors, which are operably connected. Memory 206 can store instructions 208 and data 210. For example, instructions 208 can be implemented by processors 204 to perform operations according to one or more aspects of the present disclosure.

Computing device(s) 202 can include or implement one or more modules including, for example, user/location entity interaction extraction module 212 and location history module 214.

It will be appreciated that the term "module" refers to computer logic utilized to provide desired functionality. Thus, a module can be implemented in hardware, firmware and/or software controlling a general purpose processor. In one embodiment, the modules are program code files stored on the storage device, loaded into memory and executed by a processor or can be provided from computer program products, for example, computer executable instructions that are stored in a tangible computer-readable storage medium such as RAM hard disk or optical or magnetic media.

According to an aspect of the present disclosure, computing device(s) 202 can implement user/location entity interaction extraction module 212 to analyze available data to extract one or more interactions between a particular user and a particular location entity.

As used herein, a location entity refers to any feature, landmark, point of interest, or other object or event associated with a geographic location. For instance, a location entity can include a business, restaurant, retail outlet, coffee shop, bar, music venue, attraction, museum, theme park, arena, stadium, festival, organization, entity, region, neighborhood, or other suitable points of interest.

Each location entity can be designated by a semantic identifier (e.g. the common "name" of restaurant, store, monument, etc.), as distinguished from a coordinate-based or location-based identifier. However, in addition to a name, the data associated with a particular location entity can further include the location of the location entity, such as longitude, latitude, and altitude coordinates associated with the location entity.

User/location entity interaction extraction module 212 can be implemented to analyze data associated with various online services to identify any interactions between a particular user and a particular location entity. As an example, user/location entity interaction extraction module 212 can analyze search data 216, map data 218, email data 20, social media data 222, or other suitable forms of data to extract one or more interactions.

As an example, an interaction evidenced by search data 216 can include a search query inputted by a user that references a particular location entity. As another example, an interaction evidenced by map data 218 can include a request for directions to a particular location entity or a selection of an icon representing the particular location entity within a mapping application. As yet another example, an interaction evidenced by email data 220 can include flight or hotel reservations to a particular city or lodging or reservations for dinner at a particular restaurant. As another example, an interaction evidenced by social media data 222 can include a check-in, a like, a comment, a follow, a review, or other social media action performed by the user with respect to a particular location entity.

Thus, user/location entity interaction extraction module 212 can analyze available data to extract interactions between a user and a location entity. Further, interaction extraction module 212 can maintain statistics regarding aggregate interactions for a location entity with respect to all users for which data is available.

As such, in some embodiments, in order to obtain the benefits of the techniques described herein, the user may be required to allow the collection and analysis of search data, map data, email data, mobile payment system data, and/or social media data associated with the user or her device(s). For example, in some embodiments, users may be provided with an opportunity to control whether programs or features collect such information. If the user does not allow collection and use of such signals, then the user may not receive the benefits of the techniques described herein. The user can also be provided with tools to revoke or modify consent. In addition, certain information or data can be treated in one or more ways before it is stored or used, so that personally identifiable information is removed.

Computing device(s) 202 can implement location history module 214 to generate a user location history for each of a plurality of users. Location history module 214 can generate the user location history for each used based on interaction data received from interaction extraction module 212, confirmed place visits data 224, and raw location updates 226.

For example, each of the raw location updates 226 can be a location report received from a device associated with a user. Each location report can specify or otherwise indicate a location (e.g. a latitude and longitude) and a time.

Location history module 214 can include a location report segmentation module 228, a candidate entity identification module 230, a feature value computation module 232, and an entity scoring module 234.

More particularly, location report segmentation module 228 can be implemented to cluster a plurality of raw location reports 226 into a plurality of segments. For example, the location reports can be clustered into segments based on distance.

Candidate entity identification module 230 can be implemented to identify a plurality of location entities for each segment generated by segmentation module 228. For example, candidate entity identification module 230 can access mapping data to identify one or more location entities approximate to one or more locations specified by the location reports included in a segment.

Feature value computation module 232 can compute a plurality of feature values for each location entity identified by candidate entity identification module 230. For example, in some implementations, feature value computation module 232 can compute the feature values based on interaction data extracted by interaction extraction module 212.

Entity scoring module 234 can determine a score for each location entity identified by candidate entity identification module 230. For example, the score for each location entity can be based on the feature values computed by feature value computation module 234.

Thus, implementation of location history module 214 can result in generation of a user location history for each of a plurality of users. As an example, the user location history for each user can specify location entities visited by a user at respective intervals of time. The user location histories can be stored in a user location history database 236.

According to another aspect of the present disclosure, the user location histories 236 can be accessed by one or more computing devices (e.g. computing device(s) 202 or other computing device distinct from device(s) 202) to provide one or more location-enhanced services.

As an example, user location histories 236 can be accessed to provide enhanced search results 238 that include one or more location entities included in a user's location history. In particular, in some implementations, one or more server computing devices can receive a search query from a client device associated with a particular user. If the search query references the user's location history, then the server computing devices can access and analyze the particular user location history 236 associated with the user and return enhanced search results 238.

As another example, the user location history database 236 can be accessed to provide data for display in an interactive user interface 240. In some implementations, the user interface 240 can allow a user to edit the user location history 236.

As other examples, the user location histories can be accessed to enhance social media, mapping applications, or other suitable applications. In some implementations, the user location history database 236 can be accessed using an API.

Figure 3:
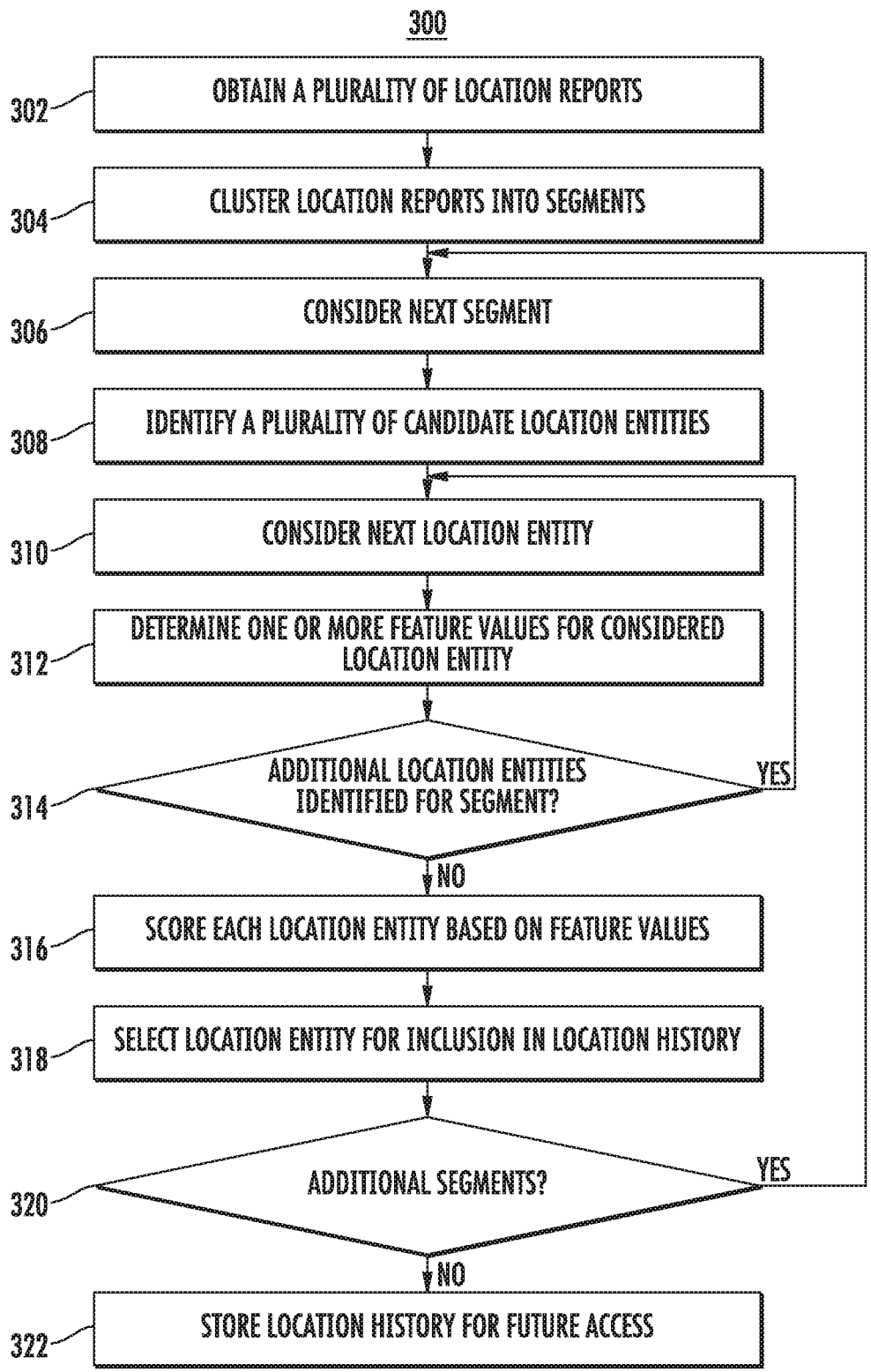
FIG. 3 depicts a flow chart of an example method for generating a user location history according to an example embodiment of the present disclosure.

FIG. 3 depicts a flow chart of an example method (300) for generating a user location history according to an example embodiment of the present disclosure. Method (300) can be implemented using any suitable system, including, for example, system 200 of FIG. 2. In addition, although FIG. 3 depicts steps performed in a particular order for purposes of illustration and discussion, the methods discussed herein are not limited to any particular order or arrangement. One skilled in the art, using the disclosures provided herein, will appreciate that various steps of method (300) can be omitted, rearranged, combined, and/or adapted in various ways without deviating from the scope of the present disclosure.

At (302) a plurality of location reports can be obtained. For example, one or more devices associated with a user can periodically provide a raw location report to one or more servers and the received reports can be stored. In some implementations, each location report can provide a time and a location. For example, the location included in each location report can be a geocode (e.g. latitude and longitude), IP address information, WiFi location information, or other information identifying or associated with a particular location. At (302) the plurality of location reports can be accessed from memory or otherwise obtained.

At (304) the location reports can be clustered into segments. As an example, at (304) the plurality of location reports obtained at (302) can be clustered based on location or time. Thus, for example, if a number of location reports provide the same general location over a significant period of time, then such reports can be clustered together to form a segment.

As another example, in some embodiments, a score can be determined for each of a plurality of candidate segments at (304). For example, the score for each candidate segment can be based on a distance from each location report included in such candidate segment to a mean location associated with the candidate segment. The candidate segments receiving the highest scores can be selected for use by a system implementing the present disclosure.

In some implementations, the score for each candidate segment can equal the summation for all location reports included in such segment of the following equation: $(1-[(\text{distance from location report to mean segment location})^2/k^2])$. Therefore location reports closer than a distance k will increase the candidate segment score while location reports further than the distance k will decrease the score. The distance k can be a constant value or can be variable based on location context, device velocity, or other parameters.

Figure 4:
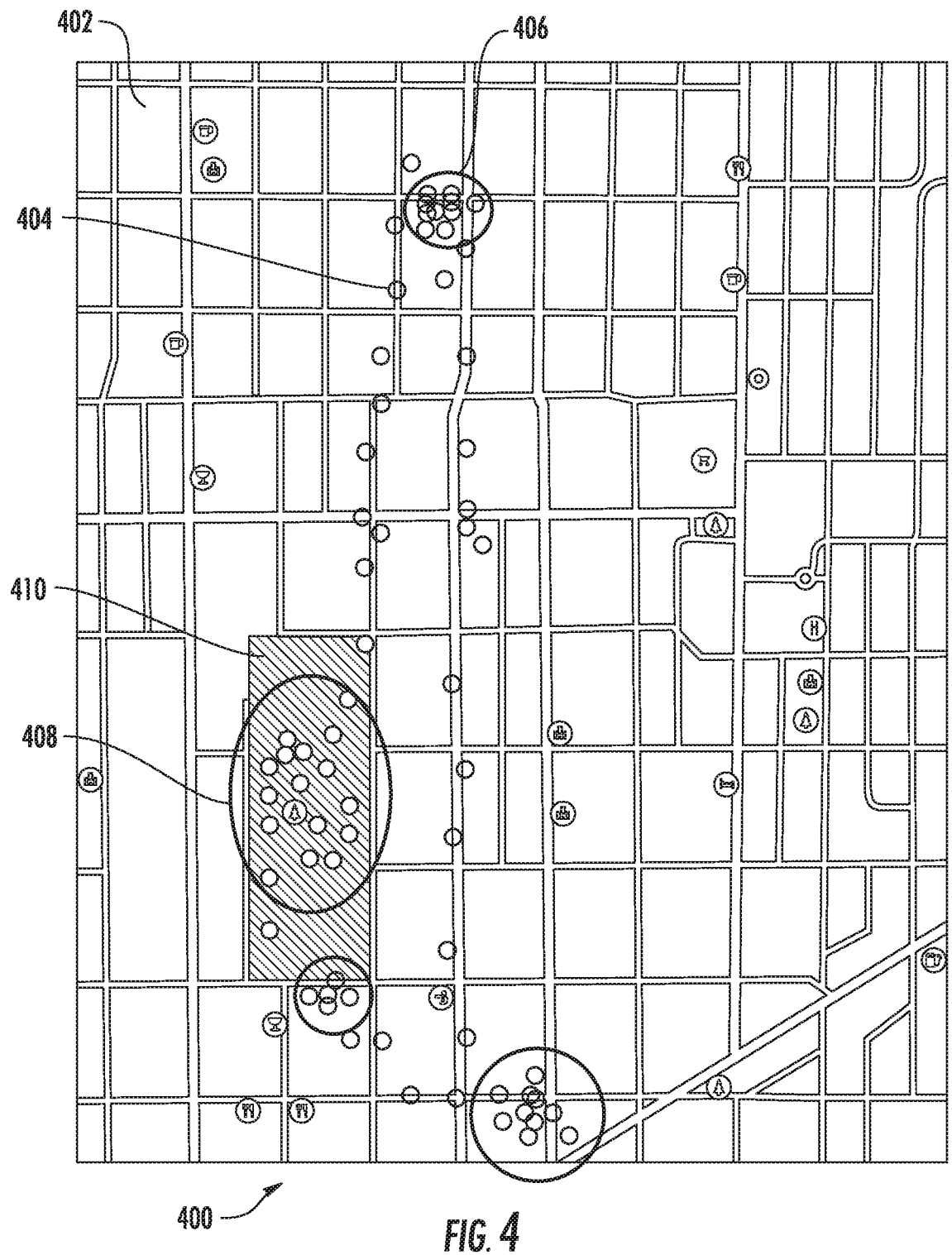
FIG. 4 depicts an example graphical representation of a plurality of location reports according to an example embodiment of the present disclosure.

As an example, FIG. 4 depicts an example graphical representation 400 of a plurality of location reports according to an example embodiment of the present disclosure. In particular, graphical representation 400 depicts a plurality of markers (e.g. marker 404) that respectively correspond to a plurality of locations respectively provided by a plurality of location reports. Thus, each marker corresponds to a location at which a device associated with a user is thought to have been located at a particular time.

As shown in FIG. 4, the plurality of markers can be clustered into a plurality of segments, such as, for example, segments 406 and 408. Each segment can include one or more of the plurality of location reports.

According to an aspect of the present disclosure, in some embodiments, clustering the location reports into a plurality of segments can include a consideration of contextual information regarding the location that the location reports indicate. For example, in some implementations, location entity boundaries, categorizations, or other information can affect the clustering of location reports.

As an example, segment 408 includes a plurality of location reports that indicate the user was walking in a park 410. Thus, small gaps between location reports can be merged is the inferred activity is the same. Therefore, while the location reports included in segment 408 may not have corresponded to a segment in other circumstances, because they are located within the boundaries of park 410 the location reports can be clustered to form segment 408.

Further, a starting time and ending time can be associated with each segment. For example, the starting time for each segment can be the earliest time associated with any location report included in such segment. Likewise, the ending time for each segment can be the latest time associated with any location report included in such segment. In some implementations, if the ending time of a segment minus the starting time of the segment is not greater than a threshold value (e.g. ten minutes), then such segment can be discarded or otherwise ignored.

Referring again to FIG. 3, at (306) the next segment can be considered. In particular, after the location reports are clustered into segments at (304), the segments can be ordered according to any logic (e.g. chronological) and then considered on an individual basis. It will be understood that parallel computing can be used to consider multiple segments at once, as well. Thus, at the first instance of (306), a first segment can be considered.

At (308) a plurality of candidate location entities can be identified for the segment being considered. As an example, map data can be analyzed to identify all location entities that are within a threshold distance from a segment location associated with the segment. For example, the segment location can be a mean location of all location reports included in the segment, a median location of all location reports included in the segment, or the location of any location report included in the segment. Thus, for example, all businesses or other points of interest within 1000 feet of the mean location can be identified at (308).

At (310) the next location entity can be considered. In particular, after the location entities have been identified at (308), the location entities can be ordered according to any logic and then considered on an individual basis. It will be understood that parallel computing can be used to consider multiple location entities at once, as well. Thus, at the first instance of (310), a first location entity can be considered.

At (312) one or more feature values can be determined for the location entity being considered. More particularly, the one or more feature values determined for each location entity can respectively correspond to one or more features describing information about the location entity being valued.

As an example, the one or more features examined at (312) can be one or more distance features that capture information about how far a location entity is from the segment. Generally, the distance features depend on the segment and the location entity. Some distance features can use information from each location report included in a segment. Other distance features can use only a single segment location derived by aggregating all reports.

For example, one distance feature can describe a distance between the location entity being valued and a segment location associated with the segment for which the location entity was identified The segment location can be a mean location of all location reports included in the segment, a median location of all location reports included in the segment, or other formulations describing one or more locations associated with the segment.

As another example, another distance feature can describe the distance between the location entity being valued and the segment location divided by the max distance associated with any location entity identified for such segment. As other examples, the distance features can include various forms of scaling, evaluation of the exponential function with respect to various distances, evaluation of a logarithmic function with respect to various distances, or other formulations.

As another example, the one or more features examined at (312) can be one or more popularity features describing a popularity of the location entity being valued with respect to all people. Generally, the popularity features depend upon only the location entity. As examples, the popularity features can include or be influenced by a number of social media mentions associated with the location entity being valued; a number of check-ins associated with the location entity being valued; a number of requests for directions to the location entity being valued; and/or and a global popularity rank associated with the location entity being valued. For example, global popularity rankings can be pre-computed for location entities and accessed at (312). A s other examples, the popularity features can include various forms of scaling, evaluation of the exponential function with respect to various rankings, evaluation of a logarithmic function with respect to various rankings, or other formulations.

As yet another example, the one or more features examined at (312) can include a business hour overlap feature. In particular, the business hour overlap feature can describe whether a set of business hours associated with the location entity being valued overlap with a segment time associated with the segment with respect to which the location entity being valued was identified.

As another example, the one or more features examined at (312) can include one or more personalization features describing previous interaction between the user and the location entity being valued. Generally, the personalization features can capture how interested a user may be with respect to a particular location entity given available information about the user's previous web-usage. The personalization features can depend upon the location entity, the segment, and the user.

As an example, the personalization features can be influenced by a number of instances in which the user performed a map click with respect to the location entity being valued; a number of instances in which the user requested directions to the location entity being valued; a number of instances in which the user has checked-in to the location entity being valued; a number of instances in which the user has performed a web search query with respect to the location entity being valued; and/or a rating or review provided by the user for the location entity.

As another example, the personalization features can be influenced by a number of instances in which the user has transacted with the location entity as evidenced by data obtained from a mobile payment system or virtual wallet.

Thus, for example, a location entity with which the user has frequently interacted with in the past can receive larger personalization feature values. Furthermore, in some implementations, the personalization features can further describe or otherwise take into account a temporal correlation between the previous interactions between the user and the location being valued and a segment time associated with the segment for which the location entity being valued was identified. For example, interactions that are closer in time to the segment time can more positively influence feature values than interactions that are more distant in time from the segment time.

At (314) it can be determined whether additional unconsidered location entities have be identified for the segment being considered. If it is determined at (314) that additional unconsidered location entities exist, then method (300) can return to (310) and consider the next location entity. However, if it is determined at (314) that additional unconsidered location entities do not exist for the segment being considered, then method (300) can proceed to (316).

At (316) each location entity for the segment being considered can be scored based on the feature values respectively determined at (312). In particular, each location entity can be scored according to a scoring formula. For example, the scoring formula can provide a score for each location entity based at least in part on a comparison of the one or more feature values associated with the location entity being scored versus the feature values associated with all other location entities identified for the segment of the location entity being scored.

As an example, in some implementations, a scoring formula numerator can equal the exponential function evaluated at a total feature value associated with the location entity being scored. In particular, the total feature value can equal the sum of each feature value associated with the location entity being scored multiplied by one of a plurality of weighting values respectively associated with the features. Likewise, the scoring formula denominator can equal a summation, for all other location entities identified for the segment, of the exponential function respectively evaluated at the total feature value for each of such location entities.

In some implementations, the plurality of weighting values can be identified using computer learning. For example, a computing device can be trained on training data having a known characterization. In particular, the training data can be data obtained from edits to the location histories received from users.

At (318) one of the location entities can be selected for inclusion in the location history. For example, the highest-scoring location entity can be selected at (318). As another example, if the score of the highest-scoring location entity is greater than a threshold value, then the highest-scoring location entity can be selected at (318) for the segment and can be included in the user location history.

At (320) it can determined whether additional unconsidered segments exist. If it is determined at (320) that additional unconsidered segments do exist, then method (300) can return to (306) and consider the next segment.

However, if it is determined at (320) that additional unconsidered segments do not exist, then method (300) can proceed to (322). At (322) the location history can be stored for future access.

Figure 5:
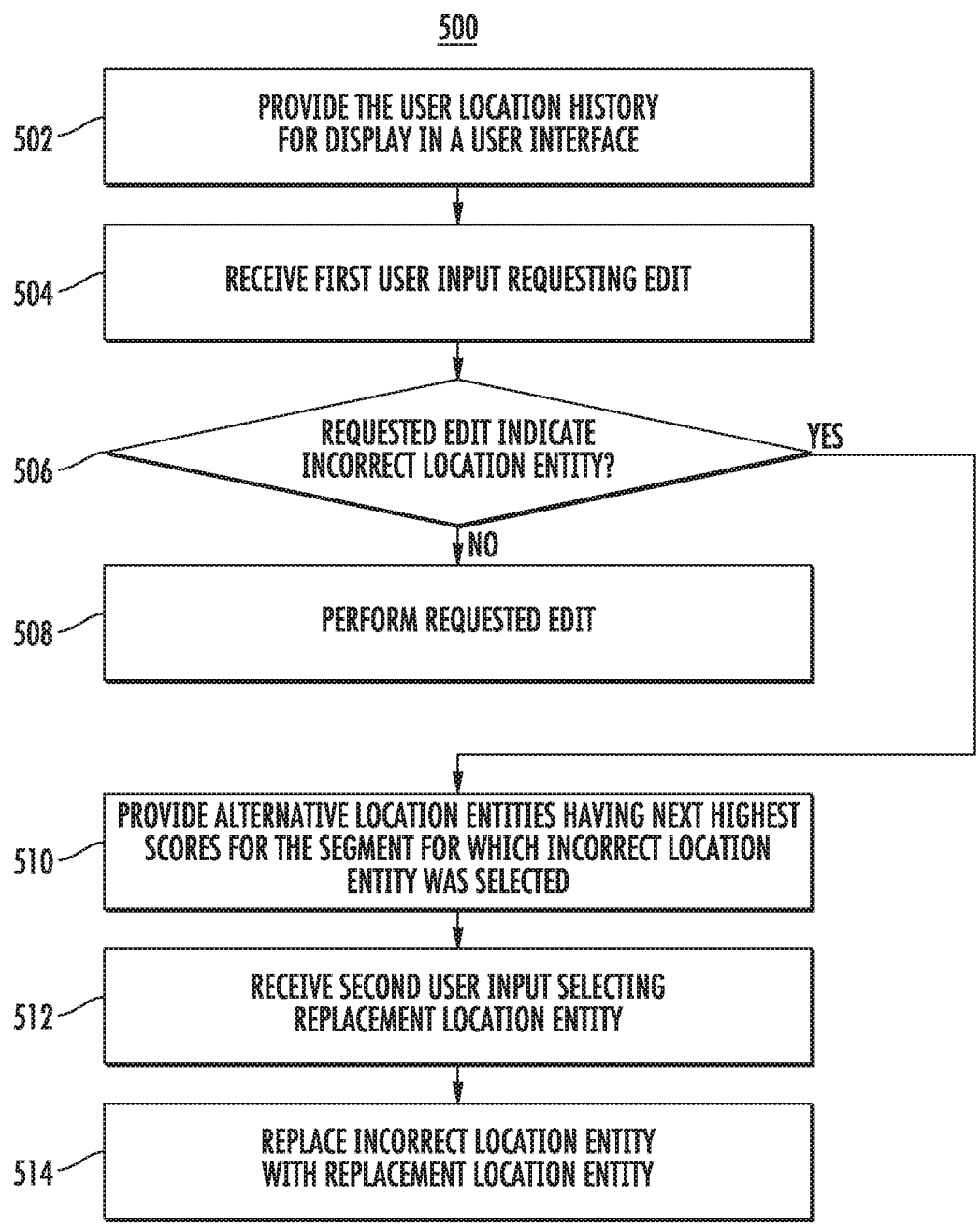
FIG. 5 depicts a flow chart of an example method for editing a user location history according to an example embodiment of the present disclosure.

FIG. 5 depicts a flow chart of an example method (500) for editing a user location history according to an example embodiment of the present disclosure. Method (500) can be implemented using any suitable computing system. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of method (500) can be omitted, rearranged, combined, and/or adapted in various ways without deviating from the scope of the present disclosure.

At (502) a user location history can be provided for display in a user interface. As an example, a user can log-in or provide identifying information to access a location history user interface. In particular, after providing identifying information, a client device can request and receive the user location history from a server and then display the user location history within a user interface At (504) a first user input can be received. For example, the first user input can request an edit to the user location history.

Figure 6:
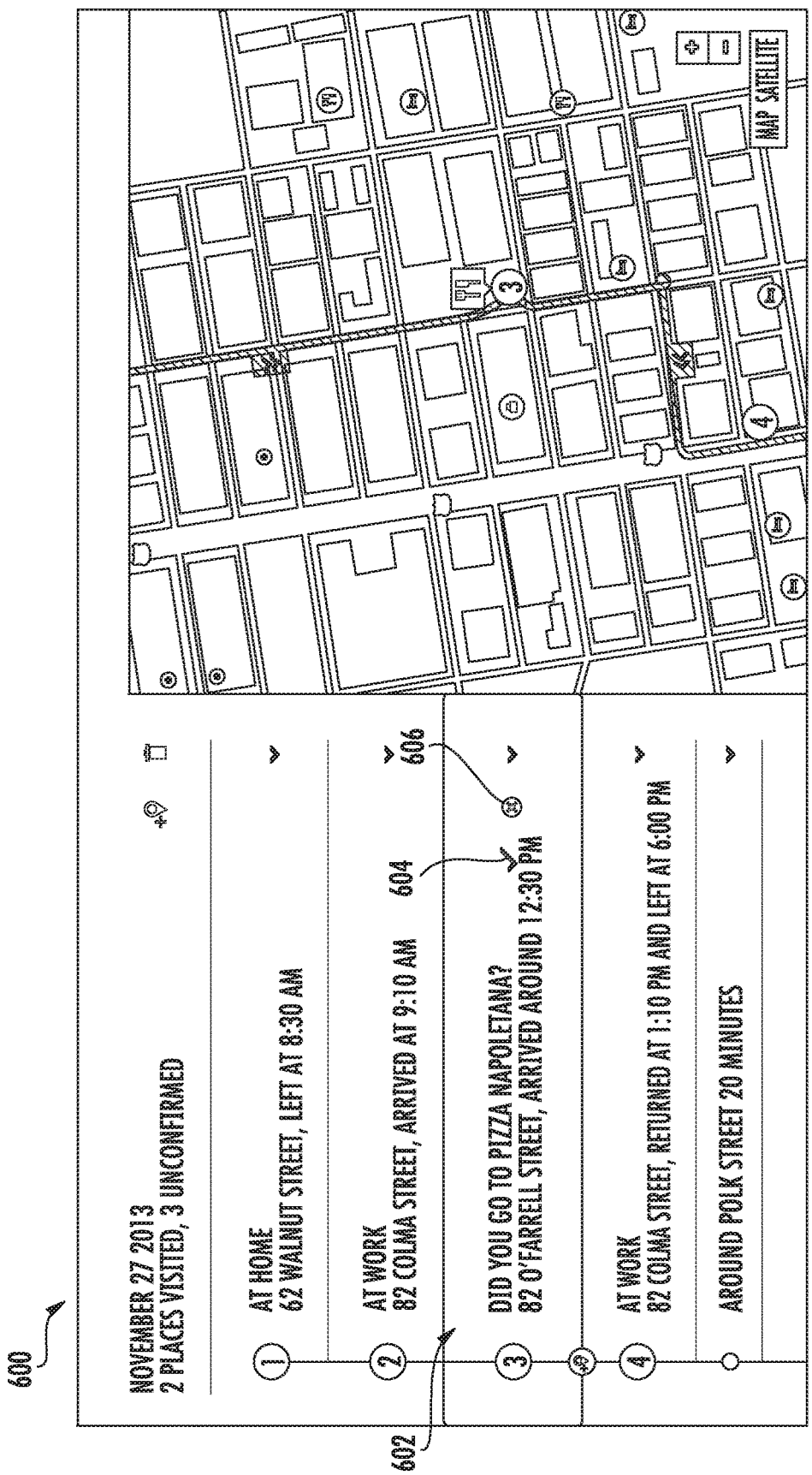
FIG. 6 depicts an example user interface providing an example graphical representation of a user location history according to an example embodiment of the present disclosure.

As an example, FIG. 6 depicts an example user interface 600 providing an example graphical representation of a user location history according to an example embodiment of the present disclosure. In particular, user interface 600 can provide one or more opportunities for the user to verify, validate, or otherwise edit location information.

As an example, portion 602 of user interface 600 offers an opportunity for the user to confirm that she did in fact visit Pizza Napoletana at the specified time. For example, portion 602 can include buttons 604 and 606 that the user can alternatively select to confirm or edit the displayed location entity.

Furthermore, the user interface 600 can provide various additional opportunities for the user to edit, control, share, personalize, or otherwise modify, explore, or interact with her location history.

Referring again to FIG. 5, at (506) it can be determined whether the requested edit indicates that the user location history includes an incorrect location entry.

If it is determined at (506) that the requested edit does not indicate that the user location history includes an incorrect location entry, then method (500) can proceed to (508) and perform the requested edit. For example, performing the requested edit at (508) can include changing a time, uploading a photograph, sharing the entry via social media, altering visibility settings for the selected location history entry, or other edits.

However, it is determined at (506) that the requested edit does indicate that the user location history includes an incorrect location entry, then method (500) can proceed to (510).

At (510) one or more alternative location entities can be provided for display in the user interface. In particular, the provided alternative entities can be the location entities having the next highest scores for the segment for which the incorrect location entity was selected. In further implementations, the provided alternative entities can be those location entities having scores greater than a threshold score for the segment for which the incorrect location entity was selected.

Figure 7:
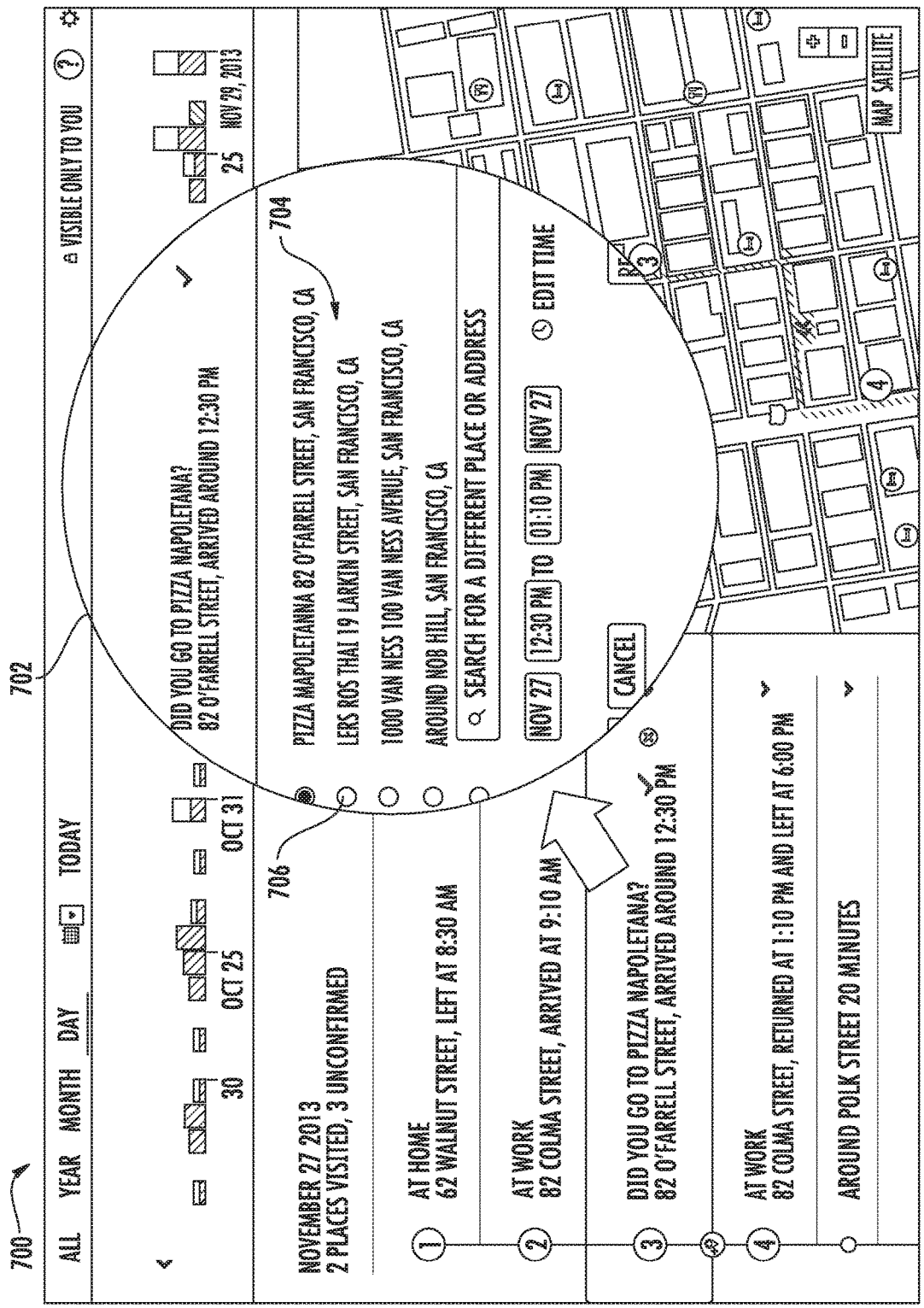
FIG. 7 depicts an example user interface providing an example graphical representation of a user location history according to an example embodiment of the present disclosure.

As an example, FIG. 7 depicts an example user interface 700 providing an example graphical representation of a user location history according to an example embodiment of the present disclosure.

Also shown in FIG. 7, is a portion 702 of user interface 700 that can be presented to the user when the user indicates that the location history contains an incorrect location entity. In particular, location 702 can provide the user with an opportunity to select a replacement location entity.

For example, portion 702 can list one or more alternative location entities (e.g. alternate location entity 704) and provide a radio button (e.g. radio button 706) or other opportunity for the user to select one of the alternative location entities as a replacement for the incorrect location entity.

Referring again to FIG. 5, at (512) a second user input selecting a replacement location entity can be received. For example, the second user input can select a location entity from a list of alternative location entities.

At (514) the incorrect location entity can be replaced with the replacement location entity. For example, one or more database entries can be revised and an updated user interface can be displayed to the user.

Figure 8:
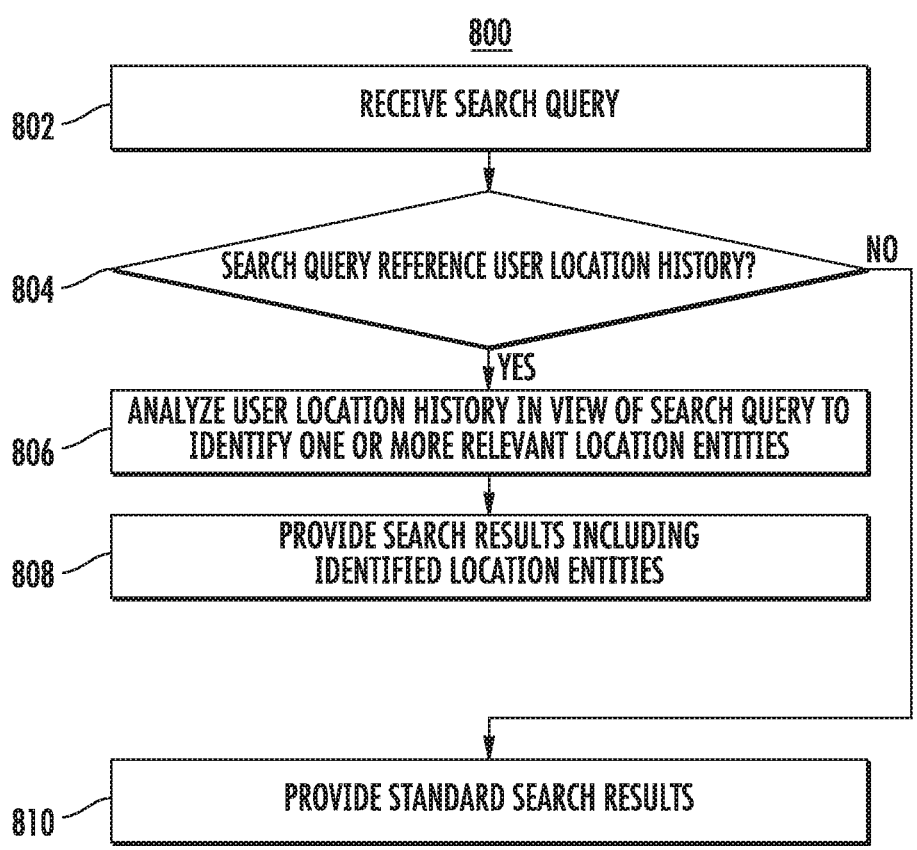
FIG. 8 depicts a flow chart of an example method for providing search results according to an example embodiment of the present disclosure.

FIG. 8 depicts a flow chart of an example method (800) for providing search results according to an example embodiment of the present disclosure. Method (800) can be implemented using any suitable computing system. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of method (800) can be omitted, rearranged, combined, and/or adapted in various ways without deviating from the scope of the present disclosure.

At (802) a search query can be received. For example, a client device can communicate with one or more server computing devices over a network (e.g. the Internet) to provide a search query to the server computing devices.

At (804) it can be determined whether the search query references the user's location history. For example, the search query can be analyzed to determine whether it requests information concerning a historical location of the user or would otherwise be beneficially supplemented by information concerning a historical location of the user.

If it is determined at (804) that the search query does not reference the user's location history, then method (800) can proceed to (810) and provide standard search results. However, if it is determined at (804) that the search query does reference the user's location history, then method (800) can proceed to (806).

At (806) the user location history can be analyzed in view of the search query. For example, a certain item of information requested by the search query can be identified and the user location history can be consulted to assist in identifying the requested information. In particular, in some implementations, one or more relevant location entities can be identified at (806) as responsive to the received search query.

At (808) search results can be provided for display to the user. For example, the search results can include the one or more location entities identified at (806) as responsive to the search query.

Figure 9:
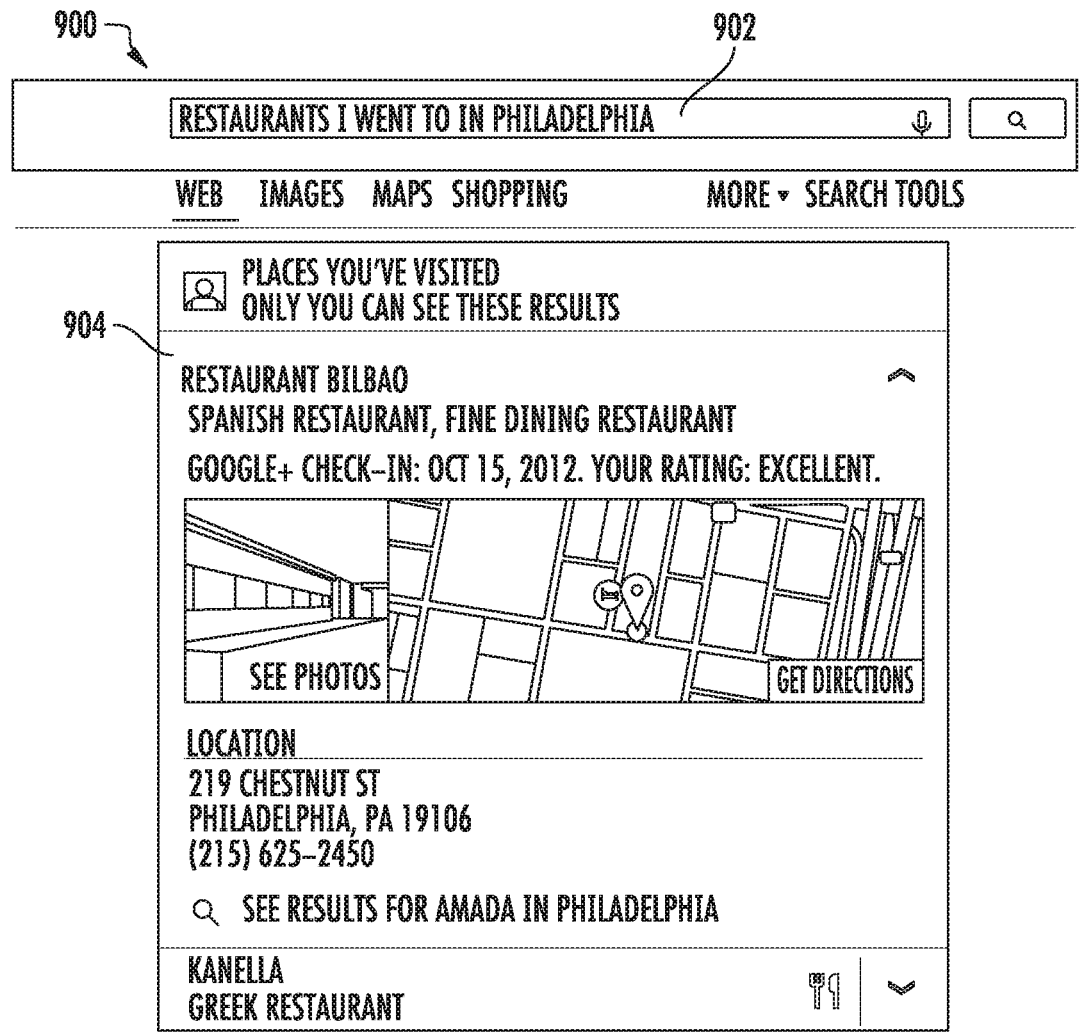
FIG. 9 depicts an example user interface for providing search results according to an example embodiment of the present disclosure.

As an example, FIG. 9 depicts an example user interface 900 for providing search results according to an example embodiment of the present disclosure. In particular, user interface 900 displays results that are responsive to a search query 902 received from the user.

The search results provided by user interface 900 can identify one or more location entities, such as, for example, location entity 904. Additional information, such as previous interactions between the particular user and the location entity (e.g. check-ins, reviews) can be provided as well, as shown in FIG. 9.

Thus, the systems and methods of the present disclosure can be implemented to transform raw location updates into a user location history that is editable, viewable, and searchable. Importantly, the user location history identifies actual location entities visited by the user so as to provide more meaningful history that represents a more human understanding the places we have visited.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

Furthermore, computing tasks discussed herein as being performed at a server can instead be performed at a client device. Likewise, computing tasks discussed herein as being performed at the client device can instead be performed at the server.

While the present subject matter has been described in detail with respect to specific example embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for generating a location history for a user, the method comprising;
   obtaining, by one or more computing devices, a plurality of location reports from one or more devices associated with the user, wherein each of the plurality of location reports indicates an associated location and time;
   clustering, by the one or more computing devices, the plurality of location reports to form a plurality of segments, wherein each of the plurality of segments includes one or more of the plurality of location reports;
   identifying, by the one or more computing devices, a plurality of location entities for each of the plurality of segments, wherein the plurality of location entities for each of the plurality of segments comprise location entities that are located approximate to one or more of the locations associated with one or more of the location reports included in such segment;
   selecting, by the one or more computing devices, one of the plurality of locations entities for each of the plurality of segments for inclusion in the location history based at least in part on scores associated with the plurality of location entities;
   providing, by the one or more computing devices, the location history for display in a user interface;
   receiving, by the one or more computing devices, data associated with a user input received from the user via the user interface, wherein the user input requests one or more edits to the location history; and
   revising, by the one or more computing devices, the location history based on the data associated with the user input such that the one or more edits requested by the user input are effectuated.

2. The method of claim 1 wherein the one or more edits requested by the user input comprise one or more of an indication of an incorrect location entity, verifying one or more of the location entities, confirming a location, confirming or changing a time, uploading a photograph, sharing an entry via social media, or altering visibility settings for a location history entry.

3. The method of claim 1, further comprising:
   providing, by the one or more computing devices for at least one of the plurality of segments, one or more of the location entities that were not selected for inclusion in the location history for display in the user interface;
   wherein the user input specifies one of the one or more of the location entities that were not selected for inclusion in the location history as a replacement for the location entity that was selected for inclusion in the location history;

wherein revising, by the one or more computing devices, the location history based on the data associated with the user input comprises replacing in the location history, by the one or more computing devices, the location entity that was selected for inclusion in the location history with the location entity specified by the user input; and providing, by the one or more computing devices, an updated location history for display in the user interface.

4. The method of claim 1 wherein clustering, by the one or more computing devices, the plurality of location reports to form the plurality of segments comprises clustering, by the one or more computing devices, the plurality of location reports based at least in part on the plurality of locations respectively associated with the plurality of location reports.

5. The method of claim 1 wherein clustering, by the one or more computing devices, the plurality of location reports to form the plurality of segments comprises:

determining, by the one or more computing devices, a score for each of a plurality of candidate segments, wherein each of the plurality of candidate segments includes one or more of the plurality of location reports, and wherein the score for each of the plurality of candidate segments is based at least in part on a distance from each location report included in such candidate segment to a mean location associated with such candidate segment; and selecting, by the one or more computing devices, two or more of the plurality of candidate segments to serve as the plurality of segments based at least in part on the scores respectively determined for the plurality of candidate segments.

6. The method of claim 1, wherein:

a starting time and an ending time are respectively associated with each of the plurality of segments, the starting time for each of the plurality of segments being an earliest time associated with any location report included in such segment, the ending time for each of the plurality of segments being a latest time associated with any location report included in such segment; and the method further comprises discarding any of the plurality of segments for which the ending time is less than a threshold time later than the starting time.

7. The method of claim 1, further comprising:

determining, by the one or more computing devices for each of the plurality of segments, one or more feature values associated with each of the location entities identified for such segment, wherein the one or more feature values are respectively determined for one or more features describing information about the location entity being valued;

determining, by the one or more computing devices for each of the plurality of segments, a score for each of the plurality of location entities based at least in part on a scoring formula, wherein the scoring formula provides the score for each location entity based at least in part on a comparison of the one or more feature values associated with the location entity being scored versus the feature values associated with all other location entities identified for the segment of the location entity being scored.

8. The method of claim 7 wherein the one or more features comprise one or more distance features describing a distance between the location entity being valued and a segment location associated with the segment with respect to which the location entity was identified.

9. The method of claim 7 wherein the one or more features comprise one or more popularity features describing a popularity of the location entity being valued.

10. The method of claim 7 wherein the one or more features comprise a business hour overlap feature describing whether a set of business hours associated with the location entity being valued overlap with a segment time associated with the segment with respect to which the location entity being valued was identified.

11. The method of claim 7 wherein the one or more features comprise one or more personalization features describing previous interactions between the user and the location entity being valued.

12. The method of claim 1, further comprising:

receiving, by the one or more computing devices, data describing a search query received from the user, wherein the search query references one or more location entities the user has visited;

identifying, by the one or more computing devices, one or more location entities included in the location history based at least in part on the search query; and providing as results for the search query, by the one or more computing devices, the one or more location entities included in the location history and identified based at least in part on the search query.

13. A system comprising:

one or more computing devices; and one or more non-transitory computer-readable media storing instruction that, when executed by the one or more computing devices, cause the one or more computing devices to perform operations, the operations comprising:

obtaining a plurality of location reports from one or more devices associated with a user, wherein each of the plurality of location reports indicates an associated location and time;

clustering the plurality of location reports to form a plurality of segments, wherein each of the plurality of segments includes one or more of the plurality of location reports;

identifying a plurality of location entities for each of the plurality of segments, wherein the plurality of location entities for each of the plurality of segments comprise location entities that are located approximate to one or more of the locations associated with one or more of the location reports included in such segment;

selecting one of the plurality of location entities for each of the plurality of segments for inclusion in the location history based at least in part on scores associated with the plurality of location entities;

providing the location history for display in a user interface;

receiving data associated with a user input received from the user via the user interface, wherein the user input requests one or more edits to the location history; and revising the location history based on the data associated with the user input such that the one or more edits requested by the user input are effectuated.

14. The system of claim 13, the operations further comprising:

providing, for at least one of the plurality of segments, one or more of the location entities that were not selected for inclusion in the location history for display in the user interface;

wherein the user input specifies one of the one or more of the location entities that were not selected for inclusion in the location history as a replacement for the location entity that was selected for inclusion in the location history;

wherein revising the location history based on the data associated with the user input comprises replacing in the location history, the location entity that was selected for inclusion in the location history with the location entity specified by the user input; and providing an updated location history for display in the user interface.

15. The system of claim 13 wherein clustering the plurality of location reports to form the plurality of segments comprises clustering the plurality of location reports based at least in part on the plurality of locations respectively associated with the plurality of location reports.

16. The system of claim 13, the operations further comprising:

determining, for each of the plurality of segments, one or more feature values associated with each of the location entities identified for such segment, wherein the one or more feature values are respectively determined for one or more features describing information about the location entity being valued; and determining, for each of the plurality of segments, a score for each of the plurality of location entities based at least in part on a scoring formula, wherein the scoring formula provides the score for each location entity based at least in part on a comparison of the one or more feature values associated with the location entity being scored versus the feature values associated with all other location entities identified for the segment of the location entity being scored.

17. The system of claim 16, wherein the one or more features describing information about the location entity being valued comprise one or more distance features describing a distance between the location entity being valued and a segment location associated with the segment with respect to which the location entity being valued was identified, a business hour overlap feature describing whether a set of business hours associated with the location entity being valued overlap with a segment time associated with the segment for which the location entity being valued was identified, one or more personalization features describing previous interactions between the user and the location entity being valued, or one or more popularity features describing a popularity of the location entity being valued.

18. A computing system comprising:

one or more processors; and a memory storing instructions that, when executed by the one or more processors, cause the one or more processors to perform operations, the operations comprising:

obtaining a plurality of location reports respectively indicating a time and a location, the plurality of location reports being associated with one or more devices associated with a user;

clustering the plurality of location reports into a plurality of segments based at least in part on the locations respectively associated with the plurality of location reports;

for each segment:

identifying a plurality of location entities that are approximate to the location of at least one of the location reports included in such segment; and selecting one of the plurality of location entities for inclusion in a location history associated with the user based at least in part on a plurality of scores respectively associated with the plurality of location entities;

providing the location history for display in a user interface;

receiving data associated with a user input received from the user via the user interface, wherein the user input requests one or more edits to the location history; and revising the location history based on the data associated with the user input such that the one or more edits requested by the user input are effectuated.

19. The computing system of claim 18, wherein the operations further comprise:

providing, for at least one of the plurality of segments, one or more of the location entities that were not selected for inclusion in the location history for display in the user interface;

wherein the user input specifies one of the one or more of the location entities that were not selected for inclusion in the location history as a replacement for the location entity that was selected for inclusion in the location history;

wherein revising the location history based on the data associated with the user input comprises replacing in the location history, the location entity that was selected for inclusion in the location history with the location entity specified by the user input; and providing an updated location history for display in the user interface.

20. The computing system of claim 18, wherein the operations further comprise:

determining, for each location entity identified for each segment, one or more feature values respectively associated with a plurality of features, wherein the plurality of features describe information associated with the location entity being valued, wherein the plurality of features comprise one or more of one or more distance features describing a distance between the location entity being scored and a segment location associated with the segment with respect to which the location entity being scored was identified or one or more personalization features describing previous interactions between the user and the location entity being scored; and determining, for each location entity identified for each segment, a score based at least in part on a scoring formula, wherein the scoring formula provides a score for each location entity based at least in part on a comparison of the one or more feature values associated with the location entity being scored to the one or more feature values respectively associated with all other location entities identified for such segment.

* * * * *